United States Patent [19]
McGrath et al.

[11] Patent Number: 5,387,629
[45] Date of Patent: Feb. 7, 1995

[54] PHOSPHORUS CONTAINING POLY(ARYLENE ETHER)S USEFUL AS OXYGEN PLASMA RESISTANT FILMS AND IN NONLINEAR OPTICAL APPLICATIONS

[75] Inventors: James E. McGrath, Blacksburg, Va.; Carrington D. Smith, Milford Square, Pa.; Duane B. Priddy, Jr., Midland, Mich.; Timothy Pickering, Radford, Va.

[73] Assignees: The Center for Innovative Technology, Herndon; Virginia Polytechnic Institute & State University; Virginia Tech Intellectual Properties, Inc., both of Blacksburg, all of Va.

[21] Appl. No.: 99,993

[22] Filed: Jul. 30, 1993

Related U.S. Application Data

[63] Continuation-in-part of Ser. No. 920,989, Jul. 28, 1992.

[51] Int. Cl.$^6$ .................................................. C08K 5/23
[52] U.S. Cl. ...................................... 524/190; 430/141
[58] Field of Search ............... 524/190, 610; 528/167, 528/168; 430/141

[56] References Cited

U.S. PATENT DOCUMENTS

| | | | |
|---|---|---|---|
| 4,973,631 | 11/1990 | McGrath et al. | 525/534 |
| 5,079,333 | 1/1992 | McGrath et al. | 528/167 |
| 5,086,156 | 2/1992 | McGrath et al. | 528/108 |
| 5,275,924 | 1/1994 | Devonald et al. | 430/495 |
| 5,290,630 | 3/1994 | Devonald et al. | 428/333 |

*Primary Examiner*—Tae H. Yoon
*Attorney, Agent, or Firm*—Whitham, Curtis, Whitham & McGinn

[57] ABSTRACT

Polymers containing the phosphine oxide moiety are identified as being particularly useful in applications where resistance to atomic oxygen etching is required and in applications where second order nonlinear optical effects will be utilized. Particularly preferred polymers for these two applications include poly(arylene ether phosphine oxide)s (PEPOS), and novel PEPOS which include phenolphthalein sub-units and derivatives thereof have been prepared.

5 Claims, 2 Drawing Sheets

PHOSPHORUS CONTAINING POLY(ARYLENE ETHER)S USEFUL AS OXYGEN PLASMA RESISTANT FILMS AND IN NONLINEAR OPTICAL APPLICATIONS

This invention is the product of research sponsored by the National Science Foundation under NSF Grant DMA-912004. The U.S. Government may have certain rights in this invention.

CROSS-REFERENCE TO RELATED APPLICATIONS

This patent application is a continuation-in-part (CIP) application of U.S. Ser. No. 07/920,989 filed Jul. 28, 1992, and the contents of that application are herein incorporated by reference.

DESCRIPTION

BACKGROUND OF THE INVENTION

1. Field of the Invention

The invention is generally related to high performance polymeric materials and, more particularly, to phosphorus containing poly(arylene ether)s.

2. Description of the Prior Art

High performance engineering thermoplastics have become increasingly important in applications traditionally filled by metallic materials. Their use in the field of high strength, lightweight, composite resins has already found many applications in the aerospace, automotive, electronic and related industries. These industrially important thermoplastics include polyesters, polyamides, polyimides and poly(arylene ether)s (PAEs), such as the poly(arylene ether ketone)s (PEKs) and poly(arylene ether sulfone)s (PESs). The high glass transition temperatures ($T_g$s) and/or melting temperatures ($T_m$s) of these thermoplastics makes them ideal materials for use in environments where a part is exposed to high temperatures for prolonged periods of time. However, it has been found that these polymers become seriously degraded when exposed to atomic oxygen (AO), and this profoundly affects their utility in many aerospace applications as well as other applications where the part will be subjected to oxygen plasma etching. In particular, space shuttle missions which have employed such polymers have demonstrated considerable etching of the polymers due to atomic oxygen exposure while in low earth orbit upon return to earth; thereby severely reducing the useful lifetimes of the parts employing these thermoplastics. Hence, there is a need to identify materials which have an improved ability to withstand etching resulting from AO exposure.

Nonlinear optical (NLO) applications involve the interactions of electromagnetic fields in various media to produce new fields altered in phase, frequency, amplitude, or other propagation characteristics from the incident fields. Interest in materials suitable for NLO applications has increased tremendously in recent years due to data transmission needs of the computer age as well as the high-bandwidth optical switching needed in the telecommunications industry. In addition, sophisticated laser tools are in constant demand which has necessitated research directed toward finding new methods that enable individual laser pulses to perform specific functions or be readily detected in complex environments. To date, relatively few materials are known which are optically clear and which exhibit excellent hydrolytic and thermal stability as well as good electrical, mechanical and fire resistant properties.

Poly(arylene ether phosphine oxide)s (PEPOs) represent a relatively new class of engineering thermoplastics. These materials may be synthesized by the reaction of bis(4-fluorophenyl)phenyl phosphine oxide (BFPPO) or bis(4-fluorophenyl) methyl phosphine oxide (BFMPO) with bisphenols in various aprotic dipolar solvents utilizing sodium hydroxide or potassium carbonate as the base. This invention is particularly directed to the advantageous use of PEPO polymers and other polymers containing the phosphine oxide moiety in NLO applications or applications which require enhanced AO resistance, as well as to new and useful PEPO compounds.

SUMMARY OF THE INVENTION

It is an object of this invention to provide a means for extending the life of parts that are subjected to intense AO conditions.

It is another object of this invention to utilize PEPOs in NLO applications.

It is another object of this invention to provide new and useful PEPO compounds.

According to the invention, experiments have been conducted that demonstrate PEPO compounds are much more resistant to AO than are traditional high performance thermoplastics. In addition, new heat resistant and transparent PEPO macromolecule compounds which include phenolphthalein and phenolphthalein derivatives in the chemical backbone have been prepared and have been identified as being particularly useful as host materials in NLO applications.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
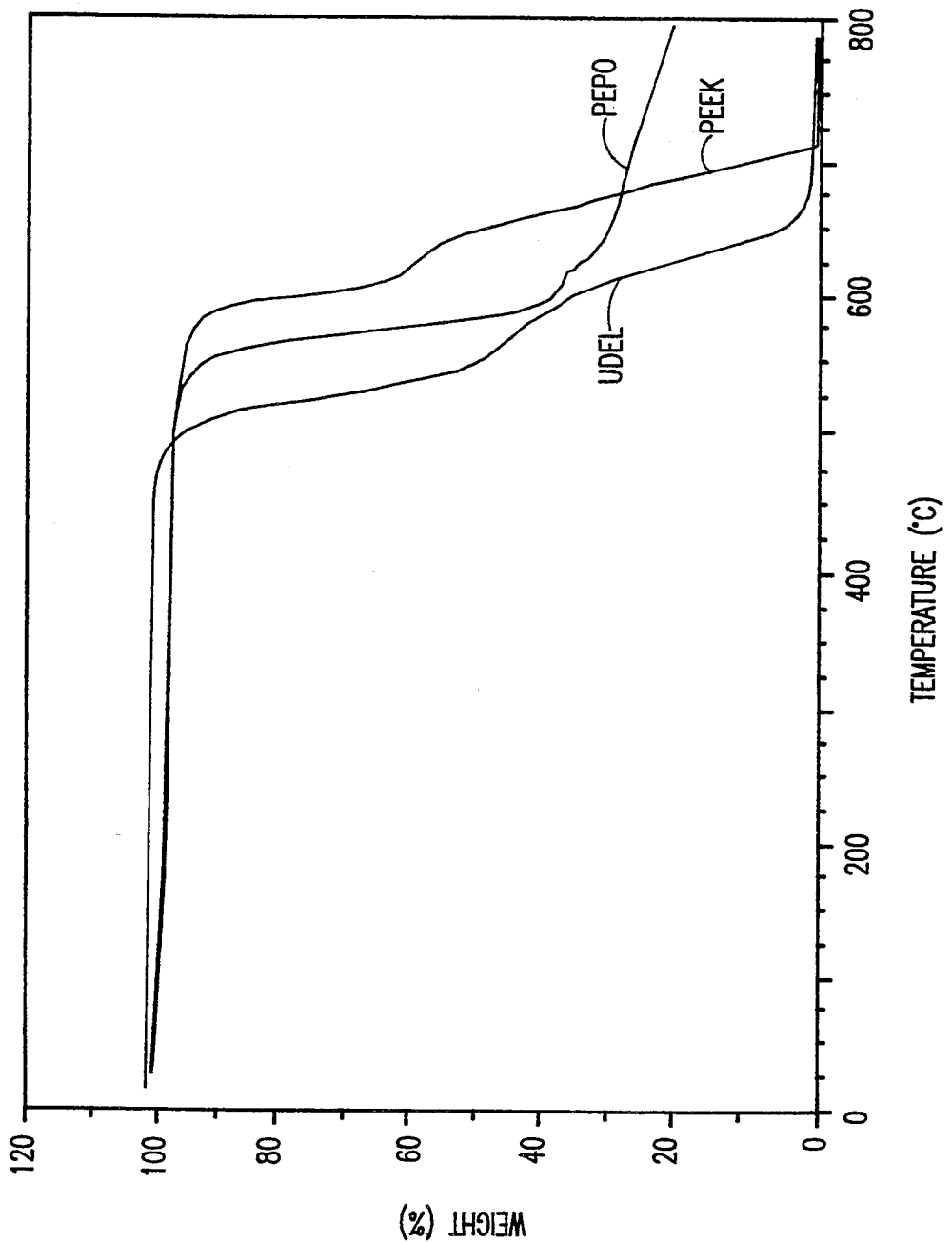
FIG. 1 is a graph showing dynamic thermogravimetric analysis (TGA) scans in air for a variety of high performance materials which highlight the enhanced heat resistance of PEPO macromolecules.

PEPO polymers can be made by a variety of methods. One method involves the nucleophilic aromatic substitution polymerization of BFPPO and BFMPO with bisphenols. The BFPPO and BFMPO monomers can be prepared by Grignard-type synthesis. The Grignard pathway has relatively few steps and provides high yields. Reaction schemes 1 and 2 are presented for exemplary purposes only and show the preparation of particular PEPO compounds; however, it should be understood that a wide variety of PEPO compounds can be made simply by varying the starting materials or by using different reaction processes (e.g., Friedel-Crafts synthesis, etc.).

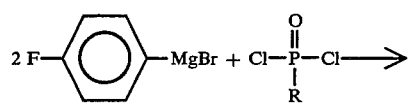
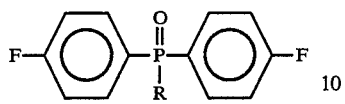

where R can be a substituted aryl or alkyl group, and particularly can be a phenyl or methyl group, and where the Grignard reaction proceeds in two steps where the first step is performed in tetrahydrofuran (THF) at 0°–5° C. for forty eight hours and the second step proceeds at 25° C. for sixteen hours.

Reaction scheme 2:

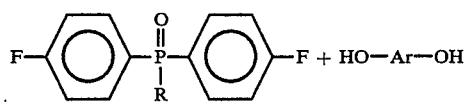

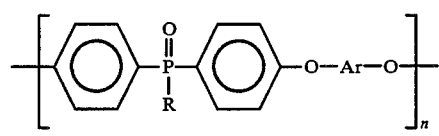

where the reaction proceeds in a solvent solution of dimethyl acetamide (DMAc) or N-methylpyrolidone (NMP), toluene, and potassium carbonate ($K_2CO_3$) at 145° C. for 4 hours to remove water followed by heating at 165° C. for 16 hours. The aryl constituent (Ar) can be any of a variety of monomers including the following monomers from which polymers have been prepared:

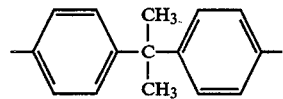 BIS A

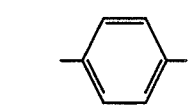 HQ

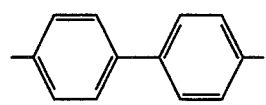 BP

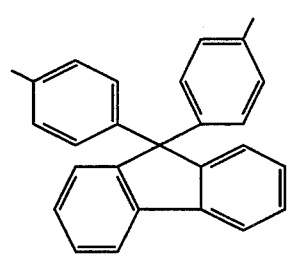 FL

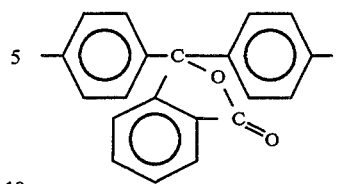 phenolphthalein

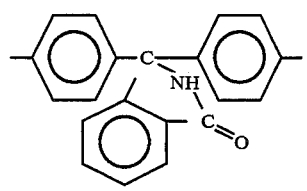 phenolphthalimidine phenophthalein anilide phenolphthalein hydrazine derivative where R is a substituted or unsubstituted aryl or alkyl group.

In the practice of this invention, the important feature is that the polymer backbone must include phosphine oxide units defined by the following structure:

where R′, R″, and R‴ are substituted or unsubstituted aryl or alkyl groups including heterocyclic aryl and/or alkyl groups. Particularly preferred macromolecules within the practice of the invention are polymers with the phosphine oxide moiety and PEPO polymers as set forth below:

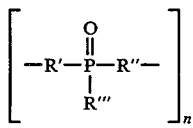

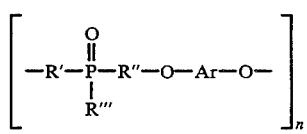

where n is greater than 1 and R' and R" are substituted or unsubstituted aryl or heterocyclic aryl groups, and R''' is a substituted or unsubstituted aryl, heterocyclic aryl, alkyl or heterocyclic alkyl group. The R', R", and R''' groups may be the same or different and may be substituted with $C_{1-3}$ alkyl groups, ethers, esters, amines, nitro, and other groups. The macromolecules can be prepared by a variety of different synthesis techniques. The phosphine oxide homopolymer presented above can be made by Friedel-Crafts reaction. EXAMPLE 1, discussed below, presents methods for preparing BFPPO, BFMPO, and BIS A PEPO; however, it should be understood that a variety of other techniques can be used to prepare polymers which are suitable for use within the practice of this invention. For resistance to atomic oxygen, the important feature is that the polymeric backbone includes the phosphine oxide moiety. For many nonlinear optical applications, the important feature is that a phenolphthalein derivative is in the polymer backbone.

Several PEPO polymers, as discussed above in conjunction with reaction schemes 1 and 2 where the aryl constituent is selected from BIS A, HQ, BP and FL, as well as several conventional high performance thermoplastic materials were tested by differential scanning calorimetry (DSC), thermogravimetric analysis (TGA), pyrolysis, oxygen plasma etching and X-ray photoelectron spectroscopy, to characterize the PEPO polymers and compare their performance against the conventional high performance thermoplastic materials.

In the DSC and TGA investigations, DSC and TGA were carried out on a DuPont model 912 instrument, both at a heating rate of 10° C./min. The reported $T_g$s from DSC were obtained on the samples which had been cold pressed and secured in crimped aluminum pans. Scans were run at 10° C./min and the reported values were taken from the second run, after a quench cool from the first run unless otherwise noted. TGA analyses were run in flowing air at a 10° C./min heating rate and values reported are for the temperature at 5% weight loss. Intrinsic viscosity measurements on the materials were performed at room temperature using Cannon Ubbelohde viscometers. Dynamic mechanical and dielectric thermal analyses, DMTA and DETA, respectively, were performed on Polymer Laboratories instruments. DMTA experiments were carried out at 1 Hz at 5° C./min on 2 mil thick compressed bars of the desired material. The pressed bars were obtained by compressing the samples 50° C. above their $T_g$s for 15 min, then quenched cool. Storage moduli (E') and loss tangent (tan δ) values were recorded.

Table 1 shows the results of DSC and TGA investigations on the PEPO materials.

TABLE 1

| BISPHENOL | Characteristics of PEPO's | | |
|---|---|---|---|
| | η (dL/g) | $T_g$(°C.)* | $T_{g_A}$(°C.)** |
| | $CH_2Cl_2$ | | |
| R''' = ARYL | | | |
| BIS A | 1.38 | 205 | 490 |
| HQ | 1.03 | 215 | 520 |
| BP | 2.25 | 245 | 520 |
| FL | 0.60 | 282 | 530 |
| UDEL | 0.40 | 190 | 495 |
| R''' = ALKYL | | | |
| BIS A | 1.04 | 195 | 470 |
| HQ | 0.72 | 207 | 500 |
| BP | 0.75 | 234 | 495 |
| FL | 0.30 | 272 | 500 |

*Values from second run after quench cool from first run
**Values are temperature at 5% weight loss in air The transition temperatures of the PEPOs were comparable to those of PESs. Typically a 5°–10° C. increase in $T_g$ of the PEPO thermoplastics over the PESs was observed. Additionally, when comparing the phenyl and methyl substituents bonded to phosphorus along the polymer backbones, only a slight decrease (about 10° C.) in $T_g$ was noted, coincidentally corresponding to the difference in melting points of the starting monomers. The methyl pendant PEPO materials displayed slightly lower thermal stability than their all aromatic counterparts, but the 5% weight loss difference was only about 20°–30° C. when dynamically testing the polymers in air.

Formation of char appears to play an important role in the self-extinguishing properties of engineering thermoplastics. In order to qualitatively describe the behavior of the PEPO polymers when burned, films on the order of 0.5–1 mm thick were exposed to a bunsen burner flame in air for constant amounts of time, then removed after a predetermined period in the flame. The chemical structures of various thermoplastics utilized in testing along with the phosphorus containing PEPOs are shown below:

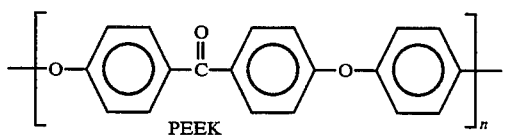
PEEK

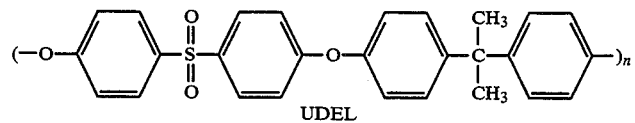
UDEL

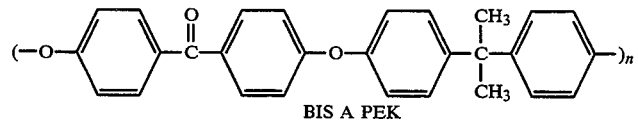
BIS A PEK

-continued

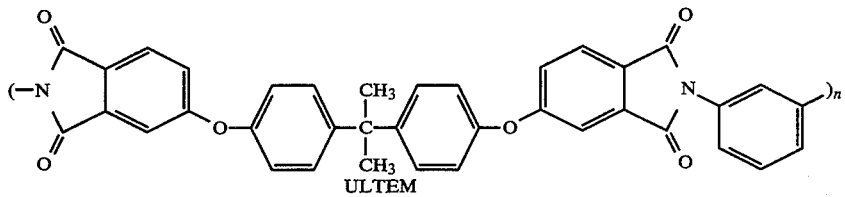
ULTEM

In all cases, non-phosphorus containing engineering thermoplastics (PEEK, UDEL, BIS A PEK, ULTEM polyimide, etc.) with very high limiting oxygen index (LOI, which is correlated to char yield) values appeared to completely volatilize. Conversely, all phosphorus containing PEPO polymers immediately extinguished upon removal from the flame. This test could be repeated several times for any single PEPO sample.

FIG. 1 shows the TGA thermograms of some commercially available engineering thermoplastics, PEEK and UDEL PSF, and a phosphorus containing PEPO, BP PEPO. One of the immediate observations which was made on the TGA thermograms of the PEPO was the high degree of char yield between 600°–800° C. The non-phosphorus containing polymers were completely volatilized by 700° C., but the PEPO typically showed between 20–40% char yield. Further, the PEPO showed a 0.5% and 3% weight loss at 300° and 350° C. in air, respectively, over an eight hour period in isothermal degradation studies. Similar characteristics to those of the BP PEPO polymer were observed for any polymeric system containing phosphorus; that is, all homopolymers, blends and copolymers with the phosphine oxide moiety showed significant char yields at these very high temperatures. The PEPO amorphous thermoplastics also showed excellent thermal stability, losing only 5% of their weight around 500° C.

Several PEPO samples were pyrolyzed in air at 600° and 700° C. with a quartz tube/furnace pyrolysis unit. Volatile pyrolysates were condensed at −100° C. at the front of a 30 m DB-5 fused silica capillary column. The oven temperature, initially at −100° C. for 3 minutes, was ramped at 20° C./min to 0° C. and then 7° C./min to 300° C. Three minutes after the onset of pyrolysis, spectra covering a range of m/z 33 to 650 were obtained by scanning every second. Product identities were confirmed based on substantial model compound studies. Table 2 shows the char yields of PEPO systems upon pyrolysis.

TABLE 2

Char Yields of Pepo Systems Upon Pyrolysis

| PEPO POLYMER | % YIELD DATA | |
|---|---|---|
| | RESIDUE (CHAR) | PYROLYSATE |
| BIS A | 31.0 | 65.8 |
| HQ | 49.7 | 53.4 |
| BP | 43.4 | 31.6 |

The large amounts of char formed in all cases with PEPO, along with the fact that very few phosphorus containing volatiles were identified, pointed to the presence of phosphorus in the char. The presence of phosphorus in both the char and volatile functions of the decomposition products was confirmed using neutron activation analysis (NAA). Table 3 summarizes the data from NAA experiments on both pyrolysis volatiles and char.

TABLE 3

Neutron Activation Analysis of PEPO Materials Before and After Pyrolysis

| PEPO POLYMER | | PHOSPHORUS CONTENT (WT %) | |
|---|---|---|---|
| | | CALCULATED | NAA |
| BIS A: | INITIAL | 6.2 | 6.4 |
| | CHAR | — | 12.0 |
| | VAPOR | — | 2.2 |
| HQ: | INITIAL | 8.1 | 9.0 |
| | CHAR | — | 15.6 |
| | VAPOR | — | 0.9 |
| BP: | INITIAL | 6.6 | 6.8 |
| | CHAR | — | 12.6 |
| | VAPOR | — | 1.7 |

Using NAA, it was confirmed that phosphorus containing degradation products were primarily non-volatile. In sharp contrast, PAEs gave essentially no char to analyze at 600° C. in air, while the PEPO materials all gave substantial amounts of char at 600° C. in air. The char is much richer in phosphorus than the initial polymer and, in all cases, the char is approximately double the content of phosphorus compared to the undegraded PEPO sample. The volatile fraction typically contains 1–2% phosphorus. Thus, it can be concluded that phosphorus presence along the backbone of these PAEs promotes primarily carbonaceous char formation upon pyrolysis, while chemistry in the gas phase probably plays only a minor role in the self-extinguishing behavior.

AO etching experiments were performed in a Plasmod plasma chamber available from the Tegal Corporation. The following four polymers were selected for investigating comparative resistance to AO etching: BIS A PEPO, UDEL PSF, BIS A PEK and ULTEM. The principle difference in structure between BIS A PEPO, UDEL PSF, BIS A PEK and ULTEM is the presence of the phosphine oxide unit along the backbone in BIS A PEPO. The parameters used in the chamber were a 13.56 MHz radio frequency generated oxygen plasma operated at 50 W of power and a pressure of approximately 1.2 torr. Ellipsometry was used to measure the thickness of very thin spin coated polymer films on ferrotype plates (chrome plated steel from Thompson Photoproducts) before and during the etching process. A Gaertner Dual Mode Automatic Ellipsometer Model L116A was utilized and plates were first cleaned by oxygen plasma treatment for 20 minutes followed by deionized water and acetone rinses. This treatment was repeated and the plates were then dried at room temperature under a nitrogen flow. Optical constants were then determined on the cleaned plates by ellipsometry. Spin coating techniques were employed to generate very thin polymer films (ca. 800–1800Å) on the ferrotype plates from dilute solution. Concentrations ranged from 1–4% (w/v) and a variety of solvents were used including methylene chloride, chloroform, or chlorobenzene. Samples were then dried in a vacuum oven at 50° C. for the low boiling solvents and 100° C. for chlorobenzene. Film thicknesses were measured from at least four spots. Measurements were taken at 30°, 50° and 70° angles of incidence and reflection to guarantee that small refractive index changes on the surface due to plasma treatment did not give rise to significant errors in measurements. The thin films were subjected to the oxygen plasma for different periods of time. Samples were initially treated for one minute, then an additional two, three, etc., up to a five minute treatment. Between each plasma treatment, ellipsometry was used to measure film thickness, and each sample was exposed for a total of fifteen minutes. It was observed that any treatment in excess of about five minutes at one time gave rise to unacceptable heating of the ferrotype plate. Representations of the data were plotted as percent polymer film height remaining as a function of time, based on an initial height of 1000Å.

Figure 2:
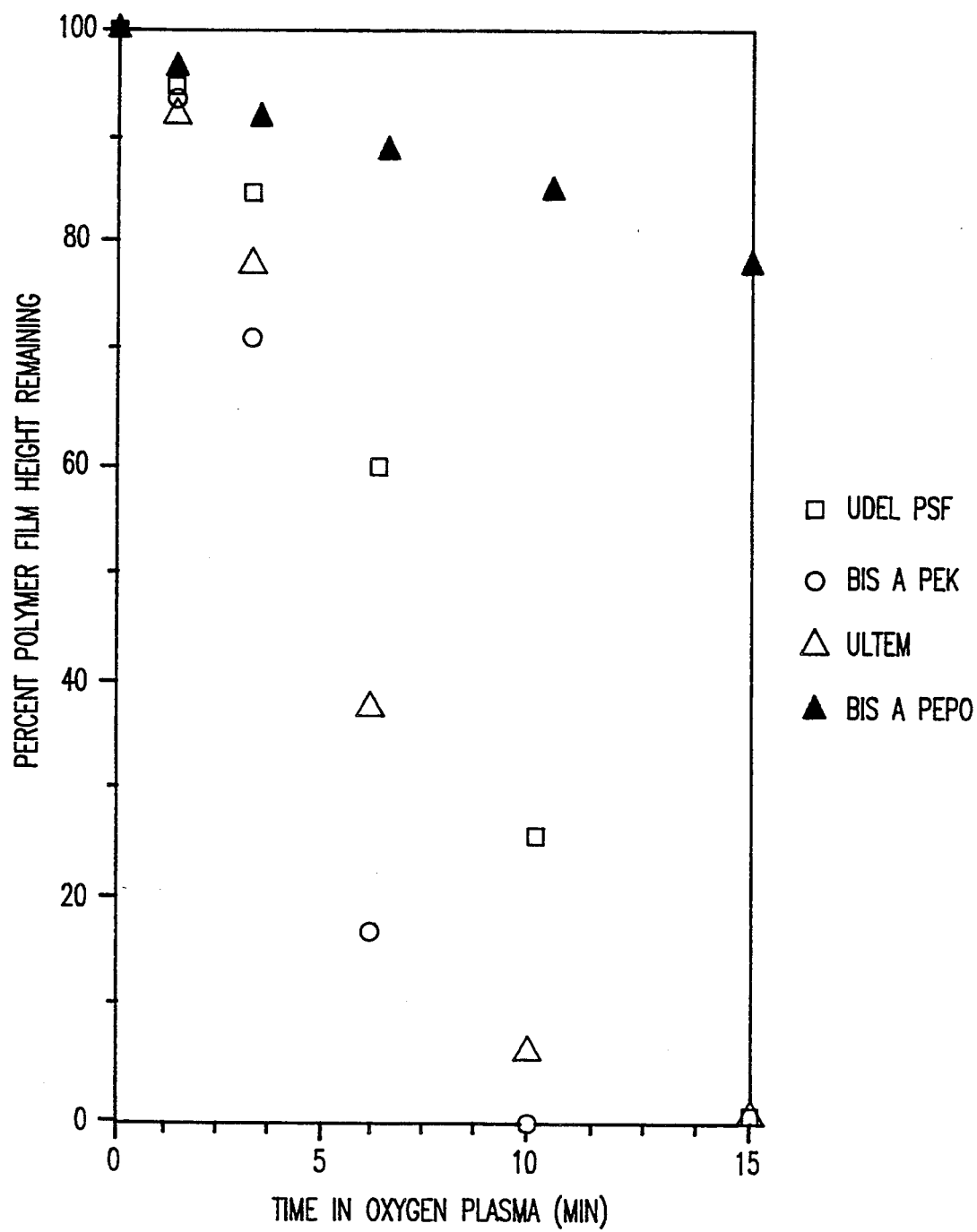
FIG. 2 is a graph showing oxygen plasma etching of a variety of high performance materials which highlight the enhanced AO resistance of PEPO macromolecules.

FIG. 2 shows the results for the AO etching experiments where the percent polymer height remaining vs. time in the oxygen plasma is graphically plotted. The PEPO material clearly outperformed the UDEL PSF, BIS A PEK and ULTEM by a substantial margin. While the UDEL PSF, BIS A PEK and ULTEM films were totally volatilized after only 15 minutes in the oxygen plasma, the BIS A PEPO material still maintained 80% of its original height. Additionally, several other commercially available engineering thermoplastics were tested and showed characteristics similar to UDEL PSF, BIS A PEK and ULTEM. This difference in performance is unexpected for such a small chemical difference in polymer structure. Moreover, the behavior of all phosphorus containing engineering thermoplastics was observed to be generic (e.g., experiments with other PEPOs gave similar results).

XPS was employed to gain an understanding of the changes in surface chemistry which led to greatly reduced rates of PEPO ablation. XPS analysis was performed using a Perkin-Elmer PHI 5300 spectrometer employing a MgK$\alpha$ (1253.6 eV) achromatic x-ray source operated at 15 KeV with a total power of 400 watts. Typical operating pressures were $<1\times10^{-7}$ torr and the surface area analyzed was either a 1 mm circular spot or a 1×3 mm rectangle. The spectrometer was calibrated to the 4f 7/2 photopeak of gold at 83.8 eV and the 2p 3/2 photopeak of copper at 932.4 eV, and all binding energies were referenced to the main C-H photopeak at 285 eV. The atomic concentration for the BIS A PEPO, BP PEPO and UDEL polysulfone films before and after a five minute oxygen plasma exposure are listed in Table 4 below:

TABLE 4

XPS Analysis of PEPO and UDEL Polymer Films Before and After 5 Minute Oxygen Plasma Treatment

| ELEMENT | BP PEPO | BIS A PEPO | UDEL |
|---|---|---|---|
| CARBON | 88.3/46 | 89.2/42 | 84.0/63 |
| OXYGEN | 8.5/40.6 | 7.6/43 | 13/32.3 |
| SULFUR | — | — | 3/3.2 |
| PHOSPHORUS | 3.2/10.4 | 3.1/11.3 | — |

After a five minute oxygen plasma exposure, all samples displayed a large increase in the oxygen content. For both PEPO samples, there was also an increase in phosphorus content, while the polysulfone showed little change in the sulfur atomic concentration. The presence of nitrogen, which is not present in the original backbone structure, was observed for both the PEPO and polysulfone samples after exposure to the plasma. This finding may be attributed to the reaction of excited species on the plasma treated surface with air during sample transfer or to the relatively low vacuum used in the reaction chamber.

The above data demonstrate that homopolymers containing the phosphine oxide moiety, and particularly PEPO polymers, are superior to conventional high performance thermoplastics for resisting AO etching. Hence, parts that are going to be exposed to oxygen plasma conditions, such as parts used in aerospace applications or in plasma etch chambers (e.g., fabrication of microelectronic circuitry where $O_2$ reactive ion etching is employed), should have the homopolymers containing the phosphine oxide moiety on their external surfaces. This can be accomplished by coating the part with the polymer or by fabricating the part entirely from the polymer or by other suitable means.

The PEPO polymers of the present invention also have particular utility in applications in which second order NLO effects and photoconductivity are required including holography, waveguides, optical switching, sensors and storage devices. For a material to be second order nonlinear active, optical chromophores must be oriented noncentrosymmetrically in the polymer matrix. Polymers that are currently used in applications that use second order NLO effects have poor thermal stability and are not practical for many device applications due to the temporary alignment of the chromophores within the polymer host. It has been found that PEPO macromolecules are ideal for applications which employ NLO effects because they have high glass transition temperatures (Tg), Good optical clarity, and can undergo strong hydrogen bonding.

A particularly useful group of PEPO compounds contemplated by this invention for second order NLO applications are phenolphthalein based PEPOs. These polymers are amorphous optically clear materials that have high Tgs and are stable in air up to 500° C. Other advantages of these materials in NLO applications include high purity, high modulus, hydrogen bonding sites, and the ability to attach the chromophores directly to the polymer backbone (as is discussed below).

Phenolphthalein, as well as derivatives such as phenolphthalimidine and phenolphthalein-anilide bisphenols, can be reacted with phosphine oxide monomers such as BFPPO and BFMPO to form PEPO polymers according to reaction schemes 3 and 4 (which are similar in character reaction schemes 1 and 2 described above).

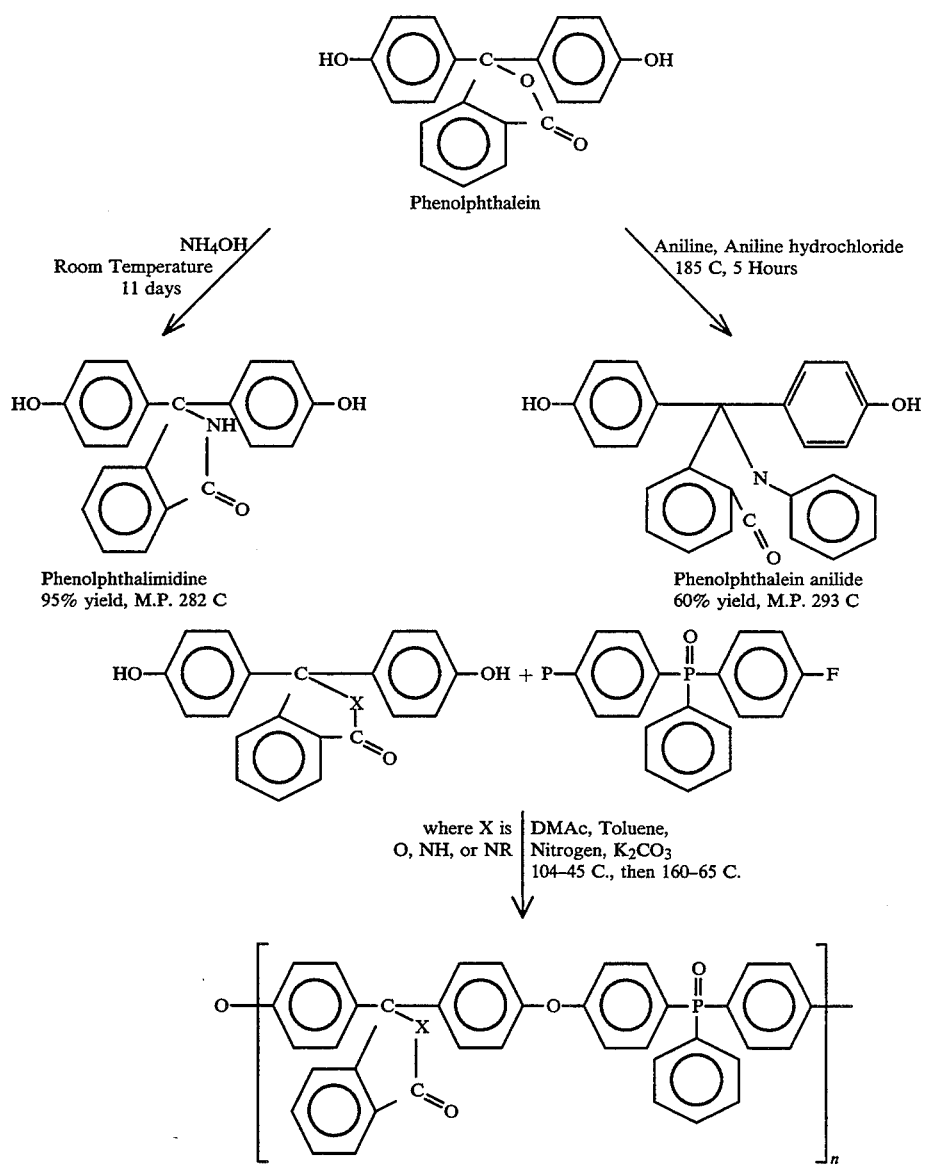

In reaction scheme 4, if x is NR, the R constituent may be a substituted or unsubstituted aryl, heterocyclic aryl, alkyl or heterocyclic alkyl group. EXAMPLE 2, discussed below, describes procedures for the preparation of phenolphthalimidine and phenolphthalein anilide, as well as the preparation of PEPO polymers containing phenolphthalein and its derivatives. Other techniques can be employed for synthesizing the phenolphthalein PEPO and phenolphthalein PEPO derivatives used in the practice of this invention.

The optimal materials will have a Tg that is higher than the melting temperature (Tm) of the chromophore. Tables 5 and 6 present Tm data for exemplary chromophores which can be used as dopants in second order NLO systems and Tg data for the phenolphthalein based PEPO macromolecules described above, respectively.

TABLE 5

Chromophores used as dopants in second order NLO systems

| Acronym | Tm (°C.) | Structure |
|---------|----------|-----------|
| DO3 | 216 | $O_2N-\bigcirc-N=N-\bigcirc-NH_2$ |
| DANS | 256 | $O_2N-\bigcirc-N=N-\bigcirc-N(CH_3)_2$ |

TABLE 6

Thermal characterization of phenolphthalein-based PEPO polymers

| PEPO Compound | Tg(°C.) | TGA (°C.)* | [η]** |
|---------------|---------|------------|-------|
| Phenolphthalein | 279 | 474 | 0.65 |
| Phenolphthalimidine | 273 | 498 | 0.33 |

TABLE 6-continued

Thermal characterization of phenolphthalein-based PEPO polymers

| PEPO Compound | Tg(°C.) | TGA (°C.)* | [η]** |
|---|---|---|---|
| Phenolphthalein/anilide | 294 | 473 | 0.30 |

*5% wt loss in air
**25° C. CH₂Cl₂ (dl/gm)

In addition to having glass transition temperatures higher than the melting temperatures of a variety of chromophore dopants, it is noted that the glass transition temperatures for the phenolphthalein PEPO macromolecules are considerably higher than for the PEPO macromolecules reported in Table 1. Dynamic TGA indicates excellent thermal stability to almost 500° C. in air. Hence, the clear, amorphous phenolphthalein PEPO compounds are ideal materials for use in applications that utilize second order non-linear optical effects.

In preparing the materials for use in NLO applications, a mixture of the polymer and the chromophore (with the chromophore ideally being present at less than 20% by weight) is heated above the Tg of the polymer. In the molten state above Tg, a charge is applied to orient the chromophores noncentrosymmetrically. The polymer is then cooled slowly and becomes a glass before the chromophore crystallizes. As a result, the chromophore is locked in place. In these materials, the phosphine oxide moiety is an excellent site for complexing with the acidic hydrogens of the chromophores, and this can aid in increasing the association of the PEPO polymer and the chromophore dopant. Experimental investigations have shown the purity of the materials prepared as described above is quite high, which contrasts sharply with commercially available materials used for measurement of second order NLO properties that typically have a number of impurities.

As an alternative to providing the chromophore as an admixture, the phenolphthalein PEPO macromolecules can be derivatized to include different chromophores directly on the polymer backbone. For example, reaction scheme 5 shows the preparation of derivatives of phenolphthalein PEPO with nitro and dinitrophenylhydrazine as the chromophores.

Reaction scheme 5

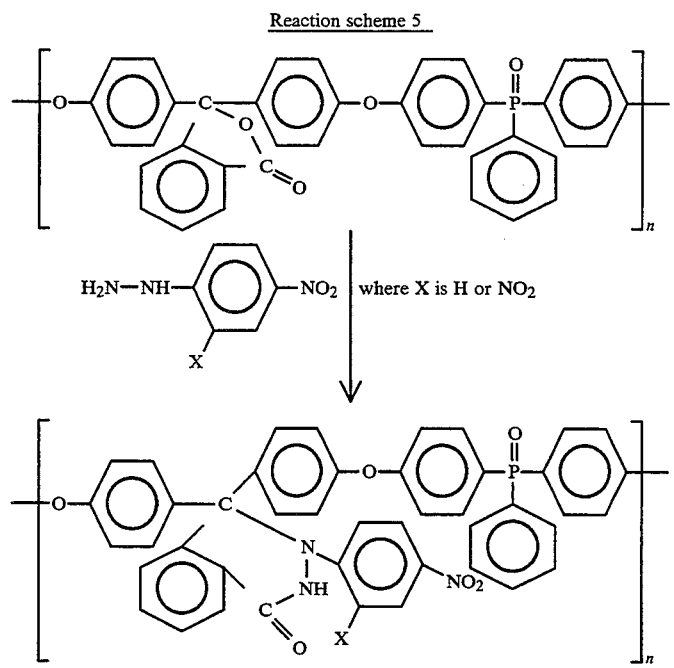

Due to the exceptional nucleophilicity of the hydrazine moiety, the chromophore is incorporated into the heterocyclic pendant lactone of the phenolphthalein (PP) PEPO backbone. The PP-PEPO that was used as the base material for the derivatization was controlled to 15,000 g/mol. The Carothers equation was utilized to determine the amount of excess PP that was needed to obtain hydroxy end groups. The intrinsic viscosity (η) was determined to be 0.31 dl/g in chloroform at 25° C. for 15,000 g/mol PP PEPO at 25° C., while intrinsic viscosity for nitro and dinitrophenylhydrazine PEPO derivatives was 0.29 dl/g in chloroform at 25° C. Example 3 presents procedures for preparing dinitrophenylhydrazine and nitrophenylhydrazine derivatives of PP PEPO for exemplary purposes (DNPH-PEPO and NPH-PEPO, respectively); however, it should be understood that PP PEPO can form derivatives with a wide variety of other chromophores. For example, other hydrazine substituted compounds could be derivatized as described above to position chromophores directly on the polymer backbone. These compounds would have the structure:

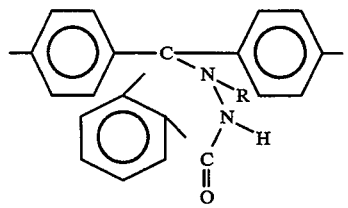

where R is a substituted or unsubsituted aryl or alkyl compound.

A gel permeation chromatography apparatus equipped with a UV-Vis detector was utilized to determine if the chromophore attached to the polymer backbone as shown in reaction scheme 5. The results from this investigation showed an even distribution of the chromophore in all the chains. Table 7 presents Tg and TGA results for PP-PEPO and certain chromophore derivatives.

TABLE 7

Characterization of 15,000 g/mol Derivatized PP PEPO

| Compound | Tg(°C.) | TGA (°C.)* | [η]** |
|---|---|---|---|
| PP PEPO | 265 | 496 | 0.31 |
| PP PEPO-NPH | 284 | 485 | 0.29 |
| PP PEPO-DNPH | 278 | 485 | 0.29 |

*5% wt loss in air
**25° C. $CH_2Cl_2$ (dl/gm)

The advantage of the PP PEPO materials in NLO applications include high purity, high modulus, hydrogen binding sites, and the ability to attach the chromophores directly to the polymer backbone.

EXAMPLE 1

BFPPO was prepared and purified by a Grignard technique as follows: 85.1 g (3.5 mol) magnesium turnings and 3.51 dry THF were added to a flame dried 5 liter 4-neck round bottom flask fitted with an overhead mechanical stirrer, an addition funnel and a nitrogen inlet. The solution was stirred at a temperature of 5° C. and 618.7 g (3.5 mol) 4-bromofluorobenzene (99%, available from Aldrich) was added dropwise over 3-4 hours. The resulting solution was stirred at room temperature forty eight hours to give a gray slightly cloudy mixture. 351.8 g (1.75 mol) phenylphosphonic dichloride (97%, Aldrich) was then added dropwise at 5° C. over 3-4 hours. The solution was stirred at room temperature overnight to yield a clear yellow mixture. 10% aqueous sulfuric acid was added to make the solution acidic to litmus. About 1 liter of water was then added and the mixture was allowed to separate into organic and aqueous layers. If separation did not occur, diethyl ether was added to induce phase separation. The aqueous layer was washed well with ether/THF mixtures and all organic phases were combined. The ether solvents were stripped off to give wet product, which was dissolved in toluene and azeotroped for several hours over activated charcoal. Filtration through celite gave a clear orange solution. Toluene was then stripped off and the crude product was twice subjected to short path distillation under reduced pressure at 160°–170° C., typically yielding 80–90% white crystalline polymer grade BFPPO having a melting point (m.p.) of 124°–126° C.

BFMPO was synthesized from methylphosphonic dichloride and 4-bromofluorobenzene using a similar technique. Purification procedures were similar to those utilized in the preparation of BFPPO with the added benefit of being able to sublime the BFMPO. Yields for monomer grade material were in the range of 70–80% (m.p. 112°–114° C.).

PEPO homopolymers were prepared as follows: a high molecular weight BIS A PEPO was prepared by adding 5.707 g (0.025 mol) BIS A and 7.856 g (0.025 mol) BFPPO to a 250 ml 4-neck round bottom flask, equipped with an overhead stirrer, a nitrogen inlet, a Dean-Stark trap with condenser, and a thermometer. The teflon coated pans from which the monomers were transferred were rinsed into the flask with DMAc, to a total volume of 90 ml DMAc. A 5% excess of $K_2CO_3$ (4.15 g, 0.03 mol) and 45 ml toluene were added to the reaction mixture. The temperature was held at approximately 150°–155° C. by a high temperature silicone oil bath and the solution was maintained under a constant nitrogen purge. After formation of the water and toluene azeotrope, the system was allowed to dehydrate for about four hours. The temperature of the mixture was then raised to 165°–170° C. and held constant for about sixteen hours. The appearance of the resulting solution was that of a dark brown viscous mixture with a white inorganic salt suspension. Finally, the mixture was allowed to cool to room temperature, diluted with chloroform, and filtered. The solution was neutralized using glacial acetic acid which yielded a clear brown to amber mixture. This solution was precipitated in a 80:20 methanol:water mixture in a high speed blender to yield a nearly white highly fibrous material. The polymer was dried overnight at 100° C. under vacuum, redissolved in chloroform, filtered, neutralized, reprecipitated in methanol and dried again under the same conditions. Other homopolymers were prepared using HQ, BP and FL in place of BIS A by similar procedures.

EXAMPLE 2

Monomer Preparation

Phenolphthalein, available from Aldrich Co., was recrystallized from methanol to yield a product with a melting point of 261°–2° C.

Phenolphthalimidine was synthesized by dissolving phenolphthalein (10 g) in 100 mL of 28% ammonium hydroxide. The solution was kept in a sealed 2 L bottle to keep the ammonia in solution. The deep purple mixture was then allowed to stand at room temperature with a brief stirring everyday for 11 days (shorter time periods may be possible). The color changed to a dull red-brown during this period and some product precipitated out of solution. The solution was poured into a stirring mixture of concentrated hydrochloric acid and ice, and the product was collected and washed with water. The amide was dissolved in hot ethanol and, upon treatment with charcoal, water was added to start crystallization. After double recrystallization, white crystals were obtained with a m.p. of 281°–3° C. in 95% yield.

Phenolphthalein anilide was prepared by refluxing a mixture of phenolphthalein (20 g), aniline hydrochloride (20 g), and 60 ml of aniline for 5 hours under nitrogen. The dark solution was then stirred into a mixture of 100 g ice and 70 g of concentrated HCl. The violet crystalline product was filtered off and washed with water. The crystals were then dissolved in ice-cold 10% sodium hydroxide solution. The solution was treated with 0.2 g active carbon, then filtered. By dropwise addition of concentrated HCl into the stirred batch, the color changed to a bright pink, then to a pure white, thick slurry with a pH of 3–4. The precipitated phenolphthalein anilide was then washed neutral with water and dried under vacuum at 70° C. The crude crystals gave a m.p. of 288°–291° C. with a yield of 79%. They were then double recrystallized from ethanol and dried under vacuum at 150° C. The resulting crystals had a melting point of 295° C.

Bis (4-fluorophenyl) phenyl phosphine oxide (BFPPO)-can be prepared as described in Example 1.

Polymer synthesis

High molecular weight PEPO compounds based on phenolphthalein were synthesized as follows: A 400 ml flask was equipped with a Dean-Stark trap, overhead stirred, nitrogen inlet, and a thermometer. One mole of BFPPO was added to the vessel followed by one mole phenolphthalein and 1.15 moles potassium carbonate. Freshly vacuum distilled N,N-Dimethylacetamide was then added followed by toluene which acts as an azeotroping agent. The temperature of the reaction mixture was raised to 140°-145° C. for a period of four hours. During this time an azeotrope of toluene and water was collected in the Dean-Stark trap. The reaction was then heated to 160° C. for sixteen hours to yield a very viscous purple solution. After cooling, methylene chloride was added to dilute the mixture and the salts were filtered off. After adding a few drops of acetic acid, the polymer was then precipitated by the addition of a 3:1 ratio of methanol/water in a Waring blender. The resulting fibrous white polymer was then filtered and dried in a vacuum oven at 200° C. for twelve hours.

In synthesizing the corresponding phenolphthalein-anilide/PEPO polymers, the above procedure was used; however, in the synthesis of phenolphthalimidine/PEPO, two moles of potassium carbonate were needed to produce high molecular weight polymer due to the presence of the lactam nitrogen which consumes excess potassium carbonate.

EXAMPLE 3

To derivatize PP PEPO, the chromophore 2,4-dinitrophenylhydrazine (DNPH), available from Janssen in 20% H₂O, was reacted under the following conditions. A 500 ml flask was equipped with a Dean-Stark trap, overhead stirrer, nitrogen inlet, and thermometer. 10 grams (0.0169 mol) of 15,000 molecular weight PP PEPO polymer was added to the vessel followed by 500 ml of o-Dichlorobenzene. The temperature of the reaction was raised to 70° C. with constant stirring until the polymer went into solution. Approximately 30 grams of DNPH (10× molar excess) was then added followed by toluene which acts as an azeotroping agent. The temperature of the reaction was raised to 140°-145° C. for a period of four hours. During this time an azeotrope of toluene and water was collected in the Dean-Stark trap. The reaction was then heated to 175° C. and a catalytic amount of p-toluenesulfonic acid monohydrate (available from Aldrich) was added. The temperature was maintained between 175° C. and 180° C. for twenty hours to yield a deep yellow/brown homogenous solution. After cooling, the reaction mixture was precipitated in 100% hexane and filtered to obtain a mixture of polymer and unreacted chromophore. After filtering, the polymer was dried, resulting in a dark brown powder. The polymer was then placed in a soxlet extractor and refluxed in methanol for 24 hours. The resulting hard polymer chunks were then dissolved in chloroform and precipitated in 100% methanol two times. After filtering, the polymer was dried in a vacuum oven at 130° C. for 24 hours. The resulting PP PEPO-DNPH (8 grams) was gray in color. PP PEPO derivatized with p-Nitrophenylhydrazine (pNPH; available from Aldrich) was prepared by the same process and was sandy yellow in color.

While the invention has been described in terms of its preferred embodiments, those skilled in the art will recognize that the invention can be practiced with modification within the spirit and scope of the appended claims.

We claim:

1. A composition useful in applications where nonlinear optical effects are utilized, comprising:
a polymer matrix including a polymer compound that has a plurality of sub-units with the chemical formula:

where R' and R" are substituted or unsubstituted aryl or heterocyclic aryl groups and may be the same or different and where R''' is a substituted or unsubstituted ary, heterocyclic aryl, alkyl, or heterocyclic alkyl group; and a chromophore distributed within said polymer matrix and distributed noncentrosymmetrically with respect to individual polymer chains of said polymer compound within said polymer matrix.

2. The composition of claim 1 wherein said polymer compound has the chemical formula:

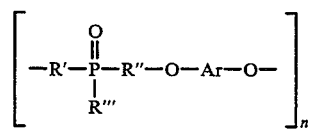

where Ar is a substituted or unsubstituted aryl group, and where n is greater than 1.

3. The composition of claim 1 wherein said chromophore is selected from the group consisting of

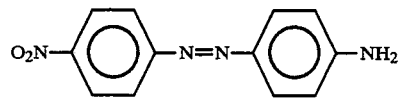

and

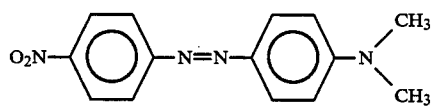

4. The composition of claim 2 wherein Ar is selected from the group consisting of

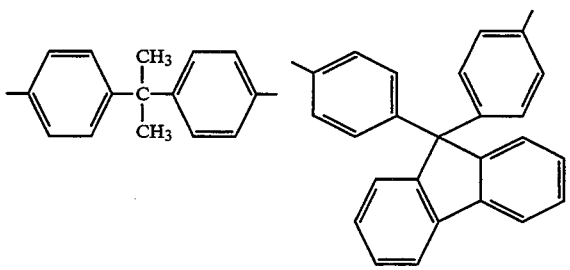

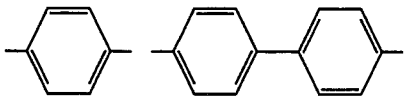

-continued
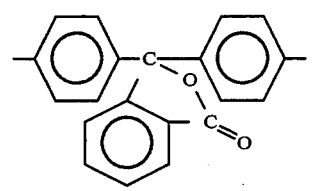
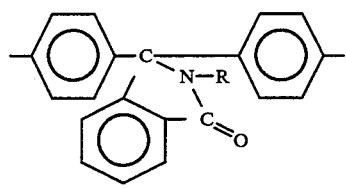
and
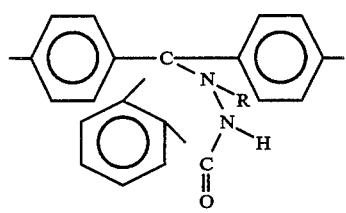
where R is a hydrogen or substituted or unsubstituted aryl or alkyl group.
5. The composition of claim 4 wherein Ar is selected from the group consisting of
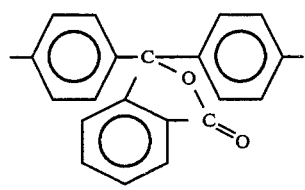
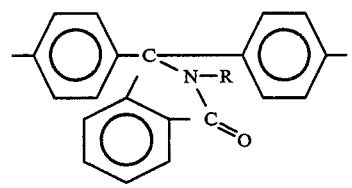
and
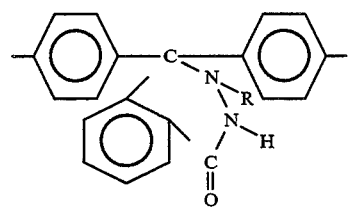
where R is a hydrogen or substituted or unsubstituted aryl or alkyl group.
* * * * *